US010784682B2

(12) United States Patent
Baker et al.

(10) Patent No.: US 10,784,682 B2
(45) Date of Patent: Sep. 22, 2020

(54) NETWORK-COGNIZANT VOLTAGE DROOP CONTROL

(71) Applicant: Alliance for Sustainable Energy, LLC, Golden, CO (US)

(72) Inventors: Kyri Alysa Baker, Arvada, CO (US); Andrey Bernstein, Golden, CO (US); Emiliano Dall'Anese, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 263 days.

(21) Appl. No.: 15/892,730

(22) Filed: Feb. 9, 2018

(65) Prior Publication Data

US 2018/0226799 A1 Aug. 9, 2018

Related U.S. Application Data

(60) Provisional application No. 62/456,751, filed on Feb. 9, 2017.

(51) Int. Cl.
*H02J 3/18* (2006.01)
*H02J 3/38* (2006.01)
(Continued)

(52) U.S. Cl.
CPC ............ *H02J 3/1892* (2013.01); *G06Q 50/06* (2013.01); *H02J 3/16* (2013.01); *H02J 3/381* (2013.01);
(Continued)

(58) Field of Classification Search
None
See application file for complete search history.

(56) References Cited

U.S. PATENT DOCUMENTS

2017/0077700 A1* 3/2017 Sun ................... G05B 17/02
2017/0133849 A1* 5/2017 Feng .................. G05F 1/70
2019/0341781 A1* 11/2019 Marchegiani ......... H02J 3/28

FOREIGN PATENT DOCUMENTS

EP 3 035 476 A1 6/2016

OTHER PUBLICATIONS

Mohammad et al. "Frequency regulation and enhanced power sharing in microgrids including modified droop coefficients and virtual resistances",2009 IEEE Electrical Power & Energy Conference (EPEC), Mar. 4, 2010, pp. 6 (Year: 2010).*

(Continued)

*Primary Examiner* — Jared Fureman
*Assistant Examiner* — Aqeel H Bukhari
(74) *Attorney, Agent, or Firm* — Robert G. Pittelkow

(57) ABSTRACT

The present disclosure provides techniques for network-cognizant droop control in power systems, such as a power distribution system. An example device includes a processor configured to determine, based on (i) a model representing a structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient. The processor may be further configured to cause at least one controllable energy resource in the plurality of energy resources to modify an output power of the at least one energy resource based on the respective value of the first droop coefficient and the respective value of the second droop coefficient.

18 Claims, 7 Drawing Sheets

(51) Int. Cl.
  H02J 3/16      (2006.01)
  H02J 3/50      (2006.01)
  H02J 3/48      (2006.01)
  G06Q 50/06     (2012.01)
  H02J 3/32      (2006.01)
  H02J 3/00      (2006.01)
(52) U.S. Cl.
  CPC ............... H02J 3/382 (2013.01); H02J 3/48 (2013.01); H02J 3/50 (2013.01); *H02J 3/003* (2020.01); *H02J 3/32* (2013.01); *H02J 3/383* (2013.01); *H02J 2203/20* (2020.01); *Y02E 40/34* (2013.01)

(56) References Cited

OTHER PUBLICATIONS

Baker et al., "Network-Cognizant Voltage Droop Control for Distribution Grids", IEEE Transactions on Power Systems, Aug. 2017, Issue 99, pp. 1-11, available at http://ieeexplore.ieee.orq/stamp/stamp.jsp?tp=&arnumber=8003321.

Bank et al., "Development of a High Resolution, Real Time, Distribution-Level Metering System and Associated Visualization, Modeling, and Data Analysis Functions", NREL Technical Report NL/TP-5500-56610, May 2013, pp. 1-36.

Chakraborty et al., "Evaluation of Multiple Inverter Volt-VAR Control Interactions with Realistic Grid Impedances", IEEE Power & Energy Society General Meeting, 2015, pp. 1-5, available at http://ieeexplore.ieee.org/stamp/stamp.jsp?arnumber=7285795.

Guggilam et al., "Scalable Optimization Methods for Distribution Networks With High PV Integration", IEEE Transactions on Smart Grid, Jul. 2016, vol. 7, No. 4, pp. 2061-2070.

Li et al., "Analysis to Inform CA Grid Integration: Methods and Default Settings to Effectively Use Advanced Inverter Functions in the Distribution System", EPRI Report 3002007139, Dec. 2015, Integration of Distributed Energy Resources Program 174, pp. 1-59.

Prieto-Araujo et al., "DC Voltage Droop Control Design for Multiterminal HVDC Systems Considering AC and DC Grid Dynamics", IEEE Transactions on Power Delivery, Apr. 2016, vol. 31, No. 2, pp. 575-585.

Rahimi et al., "Evaluation of Requirements for Volt/Var Control and Optimization Function in Distribution Management Systems", Proceedings of 2012 IEEE International Energy Conference and Exhibition, pp. 331-336.

Sarić et al., "A Robust Algorithm for Volt/Var Control", IEEE Power Systems Conference and Exposition, Mar. 2009, pp. 1-8.

Zhang et al., "Three-Stage Robust Inverter-Based VoltageNar Control for Distribution Networks with High-Level PV", IEEE Transactions on Smart Grid, Sep. 2017, pp. 1-12.

Zheng et al., "Robust Reactive Power Optimization and Voltage Control Method for Active Distribution Networks via Dual Time-scale Coordination", IET Generation Transmission & Distribution, Aug. 2016, vol. 11, No. 6, pp. 1-22.

Zhou et al., "Local Voltage Control in Distribution Networks: A Game-Theoretic Perspective", Presented at the 2016 North American Power Symposium (NAPS), Denver, CO, Sep. 2016, pp. 1-8.

Zhu et al., "Fast Local Voltage Control Under Limited Reactive Power: Optimality and Stability Analysis", IEEE Transactions on Power Systems, Sep. 2016, vol. 31, No. 5, pp. 3794-3803.

Zimmerman et al., "MATPOWER: Steady-State Operations, Planning, and Analysis Tools for Power Systems Research and Education", IEEE Transactions on Power Systems, Feb. 2011, vol. 26, No. 1, pp. 12-19.

* cited by examiner

NETWORK-COGNIZANT VOLTAGE DROOP CONTROL

CROSS-REFERENCE TO RELATED APPLICATIONS

This application claims the benefit of U.S. Provisional Application No. 62/456,751, filed Feb. 9, 2017, the entire content of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

As renewable energy becomes more important in today's society, power grids may have to manage increasingly distributed energy resources. Even modest housing may have photovoltaic (PV) systems and/or wind turbines installed to reduce dependence on the grid, and to offset energy costs. As prevalence of these distributed energy resources increases, grid managers, such as those who manage power distribution networks, will be faced with new challenges in managing network stability using power generated by distributed sources.

SUMMARY

In one example, a device includes at least one processor configured to determine, based on (i) a model representing a structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient. The at least one processor is also configured to cause at least one controllable energy resource in the plurality of energy resources to modify an output power of the at least one energy resource based on the respective value of the first droop coefficient and the respective value of the second droop coefficient.

In another example, a system includes a power management unit configured to determine, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient. The power management unit is also configured to output the respective value of the first droop coefficient and the respective value of the second droop coefficient. The system also includes a plurality of controllable energy resources in the plurality of energy resources, wherein each controllable energy resource in the plurality of controllable energy resources is configured to receive the respective value of the first droop coefficient and the respective value of the second droop coefficient and determine a respective voltage value corresponding to a point at which the controllable energy resource is connected to the power system. Each controllable energy resource is also configured to determine, based on the respective value of the first droop coefficient, the respective value of the second droop coefficient, and the respective voltage value, a respective value of an active power setpoint and a respective value of a reactive power setpoint, and modify a respective output power of the controllable energy resource based on at least one of the respective value of the active power setpoint or the respective value of the reactive power setpoint.

In another example, a method includes determining, by a power management unit comprising at least one processor, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient. The method also includes causing, by the power management unit, at least one controllable energy resource in the plurality of energy resources to modify an output power of the at least one energy resource based on the respective value of the first droop coefficient and the respective value of the second droop coefficient.

The details of one or more examples are set forth in the accompanying drawings and the description below. Other features, objects, and advantages will be apparent from the description and drawings, and from the claims.

DETAILED DESCRIPTION

The present disclosure provides systems, devices, and methods for network-cognizant droop control in power systems, such as a power distribution system. Particularly, the techniques described herein may provide proportional control techniques in which the active and reactive output-powers of DERs of a distribution system are adjusted in response to (and proportionally to) local changes in voltage levels. As one example, a central coordinator, such as a power management unit or other system, may use robust optimization to periodically generate droop coefficients for DERs in the power system based in part on a model of the power system and a forecast or prediction of noncontrollable power injections in the power system. DER controllers, such as PV inverters or others, may utilize the droop coefficients in real-time or near real-time, along with local voltage measurements, to modulate their real and reactive power outputs.

The increased deployment of DERs (e.g., photovoltaic (PV) systems) operating with business-as-usual practices has already precipitated a unique set of power-quality and reliability-related concerns at the distribution-system level. For example, in settings with high renewable energy resource penetration, reverse power flows increase the likelihood of voltages violating prescribed limits. Furthermore, volatility of ambient conditions leads to rapid variations in renewable generation and, in turn, to increased cycling and wear-out of legacy voltage regulation equipment.

The present disclosure details the design and implementation of proportional control techniques in which active and reactive output-powers of DERs are adjusted in response to local changes in voltage levels—a methodology that may be referred to as Volt/VAR/Watt control. In contrast to related-art efforts to address the concerns mentioned above, the techniques of the present disclosure may provide demonstrated system stability and avoid oscillatory behaviors that may be present in other control schemes, such as Volt/VAR control or voltage droop control. Furthermore, the techniques described herein may provide for more accurate and/or efficient control by effectively embedding network structure into the droop coefficients utilized by the DERs.

Figure 1:
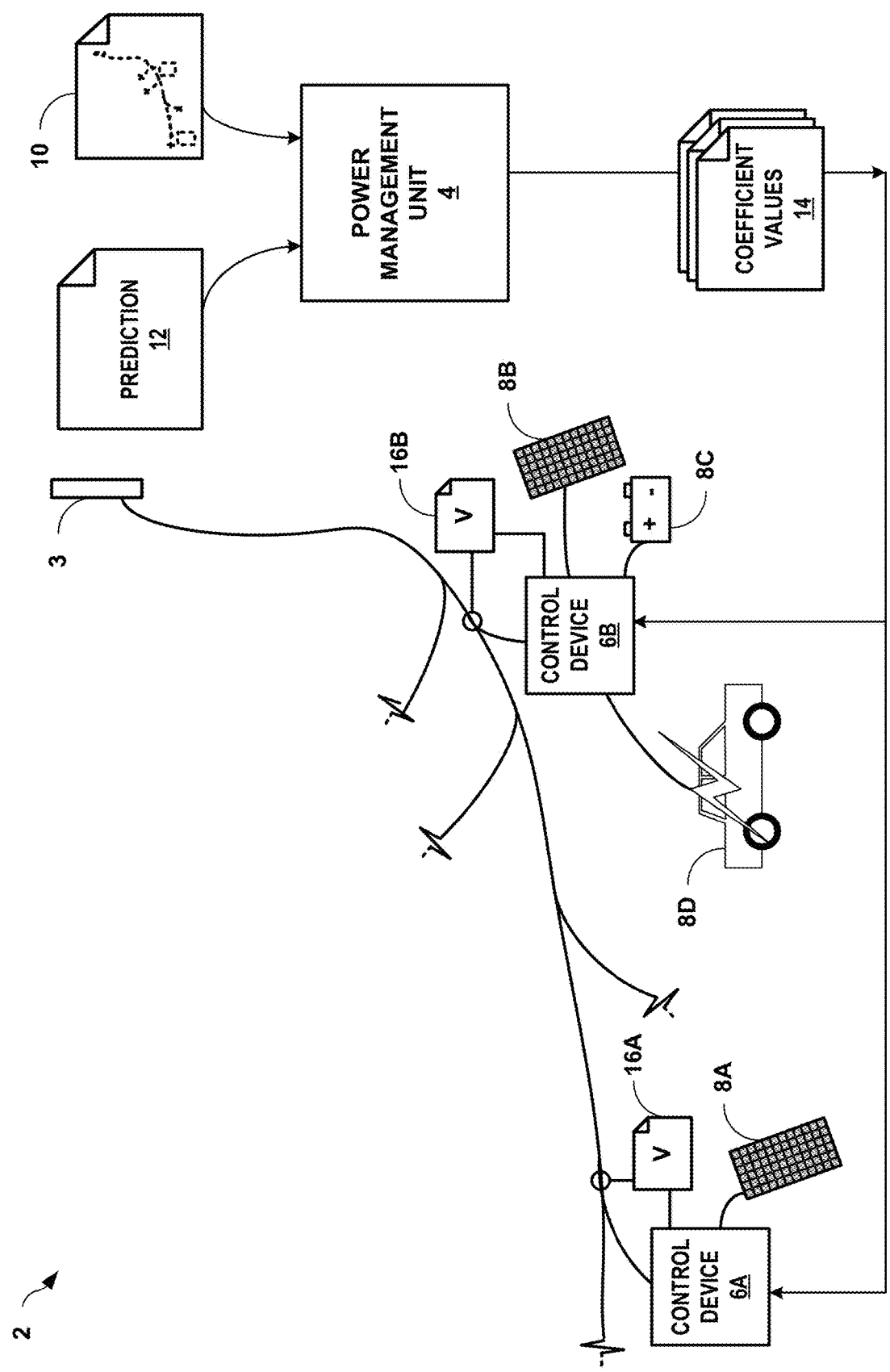
FIG. 1 is a conceptual diagram illustrating an example power management system (e.g., system 2) configured to perform network-cognizant droop control, in accordance with one or more aspects of the present disclosure.

FIG. 1 is a conceptual diagram illustrating an example power management system (e.g., system 2) configured to perform network-cognizant droop control, in accordance with one or more aspects of the present disclosure. In the example of FIG. 1, system 2 includes connection point 3 and power management unit 4. System 2 also includes control devices 6A and 6B (collectively "control devices 6") and energy resources 8A-8C (collectively "energy resources 8"). As shown in the example of FIG. 1, connection point 3 and control devices 6 are all connected via a network of power lines and, with those power lines, may represent a "power system".

System 2, as shown in the example of FIG. 1, manages a simplified power system. In other examples, the power system may include any number of additional ones of energy resources 8, and/or control devices 6. Thus, while shown in FIG. 1 as having four energy resources and two control devices, the power system may, in other examples, include more or fewer energy resources, and/or control devices in other examples. For instance, the techniques of the present disclosure may be used with a micro-grid, a subset of a power distribution network, an entire power distribution network, a community power grid (e.g., in which a collection of residents implement a local power network), a campus power grid (e.g., in which a company or educational institution implements its own power network), or any other collection of connected power generation and consumption devices. Additionally, system 2 of FIG. 1 represents only one example of a system configured to perform the techniques described herein, and various other systems, having additional components, fewer components, and/or other components, may be used in accordance with the present disclosure.

In the example of FIG. 1, connection point 3 represents a point at which the power system is connected to a larger system. For example, the power system shown in FIG. 1 may represent a power distribution network and connection point 3 may represent its connection to a power transmission network. As another example, the power system in FIG. 1 may represent a subset of a power distribution network and connection point 3 may connect the power system to the broader power distribution network. In other words, connection point 3 is the point at which the smaller power system shown in FIG. 1 connects to the rest of the power system.

In the example of FIG. 1, power management unit 4 is configured to manage the power system shown in FIG. 1 to provide power to consumers, in accordance with the techniques described herein. Power management unit 4 may help manage the distribution of power from DERs within the power system shown in FIG. 1, as well as the receipt and distribution of power from the larger power system (e.g., via connection point 3), while avoiding overloading and ensuring that consumers' power needs are met. In some examples, power management unit 4 may represent a system owned and operated by a utility company. In other examples, power management unit 4 may be owned and/or operated by another entity. For instance, power management unit 4 may represent an access point of a power network of a business park or corporate campus. As another example, power management unit 4 may manage a micro-grid, such as may be employed on a military base, mobile hospital, or other small area in which electrical power may be desirable. In other words, power management unit 4 may represent any system configured to manage power distribution via a power network.

Power management unit 4 may be a computing device, such as a server computer, a desktop computer, or any other device capable of implementing some or all of the techniques described herein. In some examples, power management unit 4 may represent a cloud computing environment. That is, while shown as a single box in the example of FIG. 1, power management unit 4 may, in some examples, be a group of distributed computing resources that communicate with one another to perform at least some of the techniques described herein. In some examples, power management unit 4 may be the same as or be physically collocated with connection point 3. For instance, connection point 3 may represent the connection between the power system shown in FIG. 1 and a power transmission network and may be a power substation that is configured to perform the operations of power management unit 4 as described herein. In some examples, such as the example shown in FIG. 1, connection point 3 and power management unit 4 may be physically separated.

In the example of FIG. 1, control devices 6 are configured to manage the power output of one or more respective energy resources in accordance with the techniques described herein. For instance, control device 6A may represent an inverter configured to receive power from energy resource 8A and transform the power into a form that can be transmitted via the connected power system. Power inverters, in general, may perform various operations to make the power output of energy resources more stable and/or more compatible with power systems. Control device 6B may represent a home energy management device configured to receive power from energy resources 8B, 8C, and 8D, manage the distribution of that power among the home, and manage power received or transmitted via the connected power system. That is, control device 6B may represent an aggregated system that manages more than one DER.

Energy resources 8, in the example of FIG. 1, are configured to generate electrical power for consumption. In other words, energy resources 8 may represent any device or system capable of generating electrical power. For instance, in FIG. 1, energy resources 8A and 8B may represent PV panels, energy resource 8C may represent an energy storage device (e.g., a battery or battery system), and energy resource 8D may represent an electric vehicle (EV). Other examples of energy resources include generators (e.g., gas generators, etc.), fuel cells, and others. While shown as separate components in the example of FIG. 1, energy devices may, in other examples, be integrated with their respective control devices.

In the example of FIG. 1, power management unit 4 may receive or otherwise have access to model 10. Model 10 may represent a structure of the power system. The power system may be represented in model 10 in various ways. As one example, model 10 may be coefficients of a linear model of voltage in the power system as a function of real and reactive power production and load in the power system.

In some examples, model 10 may be implemented within power management unit 4, such as by an administrator or user of power management unit 4. In some examples, power management unit 4 may be configured to generate model 10. In some examples, model 10 may be received from one or more other devices (not shown). In some examples, model 10 may be learned or generated (e.g., by power management unit 4) using appropriate machine learning techniques or other suitable methods. For instance, model 10 may be learned from actual measurement data, such as phasor measurement unit (PMU) measurements or other measurement devices that measure voltages, currents, and/or powers in the power system.

Model 10 may be static or may change over time. For instance, when the physical organization of the power network remains relatively the same (e.g., when the power network represents a company subsystem), it may not be necessary to modify model 10. On the other hand, if the power network changes (e.g., when the power network represents a distribution system with multiple consumers), modification of model 10 may be useful to maintain the accuracy of the techniques described herein.

In the example of FIG. 1, power management unit 4 may receive a prediction (e.g., prediction 12) of the uncontrollable portion of the power system. Prediction 12 represents the expected state of portions of the power network that are not controllable by power management unit 4. For example, prediction 12 may predict the amount of power that will be generated by certain resources in the power system as well as the amount of power that will be consumed by certain loads in the power system. In some examples, prediction 12 may be a single prediction. In other examples, prediction 12 may be a set of predictions. In some examples, prediction 12 may be in the form of a vector that collects the predicted quantities. In other examples, prediction 12 may be in the form of a set (or collection) of vectors, representing all possible values of predicted quantities.

In some examples, power management unit 4 may be configured to generate prediction 12. In some examples, Prediction 12 may be received from one or more other devices (not shown). For example, power management unit 4 may receive prediction 12 from a situational awareness unit that performs forecasts of the generation of renewable energy resources as well as loads in the system.

In the example of FIG. 1, power management unit 4 may determine, based on model 10 and prediction 12, values of a first and second droop coefficient for each controllable energy resource in the power system (e.g., coefficient values 14). In the simplified example of FIG. 1, for instance, power management unit 4 may determine two droop coefficients for each of control devices 6. Thus, in the simplified example of FIG. 1, coefficient values 14 may include four values. Determination of coefficient values 14 is further described herein below. Power management unit 4, in the example of FIG. 1, may output coefficient values 14 to each of control devices 6.

In the example of FIG. 1, each of control devices 6 may determine a local voltage value that indicates the voltage at the point at which the respective one of control devices 6 is connected to the power system. For example, control device 6A may determine voltage value 16A and control device 6B may determine voltage value 16B. Voltage value 16A and voltage value 16B are collectively referred to herein as "voltage values 16."

Control devices 6 may, in the example of FIG. 1, use their respective set of coefficient values 14 along with their respective one of voltage values 16 to determine a respective set of power setpoint values that dictate the levels of real and/or reactive power that are to be outputted by the associated energy resource or energy resources. For example, control device 6A would determine setpoint values for energy resource 8A using the relevant set of coefficient values 14 and voltage value 16A, and control device 6B may determine setpoint values for energy resources 8B, 8C, and 8D using the relevant set of coefficient values 14 and voltage value 16B. Determination of setpoint values is further described herein below. Control devices 6 may use the determined setpoint values to manage the power outputs of energy resources 8.

Components of system 2 (e.g., power management unit 4, and/or control devices 6) may be configured to perform the techniques described herein in an iterative fashion that allows system 2 to maximize operational objectives while coping with the variability of ambient conditions and non-controllable assets within the power system. For instance, the components of system 2 may perform operations every second, every millisecond, or at some other interval. In some examples, different components may perform operations at different intervals. For instance, power management unit 4 may receive model 10 and prediction 12 and generate coefficients 14 on a first timescale (e.g., every 5 minutes, every 15 minutes, or at another frequency) while control devices 6 may determine voltage values 16 and power setpoint values and use the setpoint values to modulate output power at a second timescale (e.g., every 5 ms, every 50 ms, or at another frequency). That is, power management unit 4 may periodically determine droop coefficients at a slower timescale while control devices 6 may utilize those droop coefficients in real-time or near real-time to manage output powers. In other examples, all components of system 2 may generally perform the operations described herein with the same frequency.

While certain operations are described in the example of FIG. 1 as being performed by power management unit 4 or control devices 6, these operations may, in other examples, be performed by one or more other components of system 2, or by components not shown in FIG. 1. In some examples, for instance, each of control devices 6 may be configured to receive model 10 and prediction 12 and determine coefficient values 14. As another example, power management unit 4 may, in some instances, be configured to determine local voltage values and setpoint values for each of control devices 6. In yet another example, one or both of these operations may be performed by one or more standalone computing devices (not shown) that communicate with control devices 6. This may be the case when, for example, one or more of control devices 6 are legacy devices that do not have sufficient computing power or communications abilities.

By iteratively determining droop coefficients in a robust fashion, at a relatively slower timescale, and using those droop coefficients to determine power setpoints on a real-time or near real-time basis, performance of system 2 may achieve near optimum management of the power system without requiring complex or computationally powerful components. Additionally, by incorporating voltage measurements, current measurements, and power measurements, the techniques described herein ensure that limits on these quantities are not violated.

Figure 2:
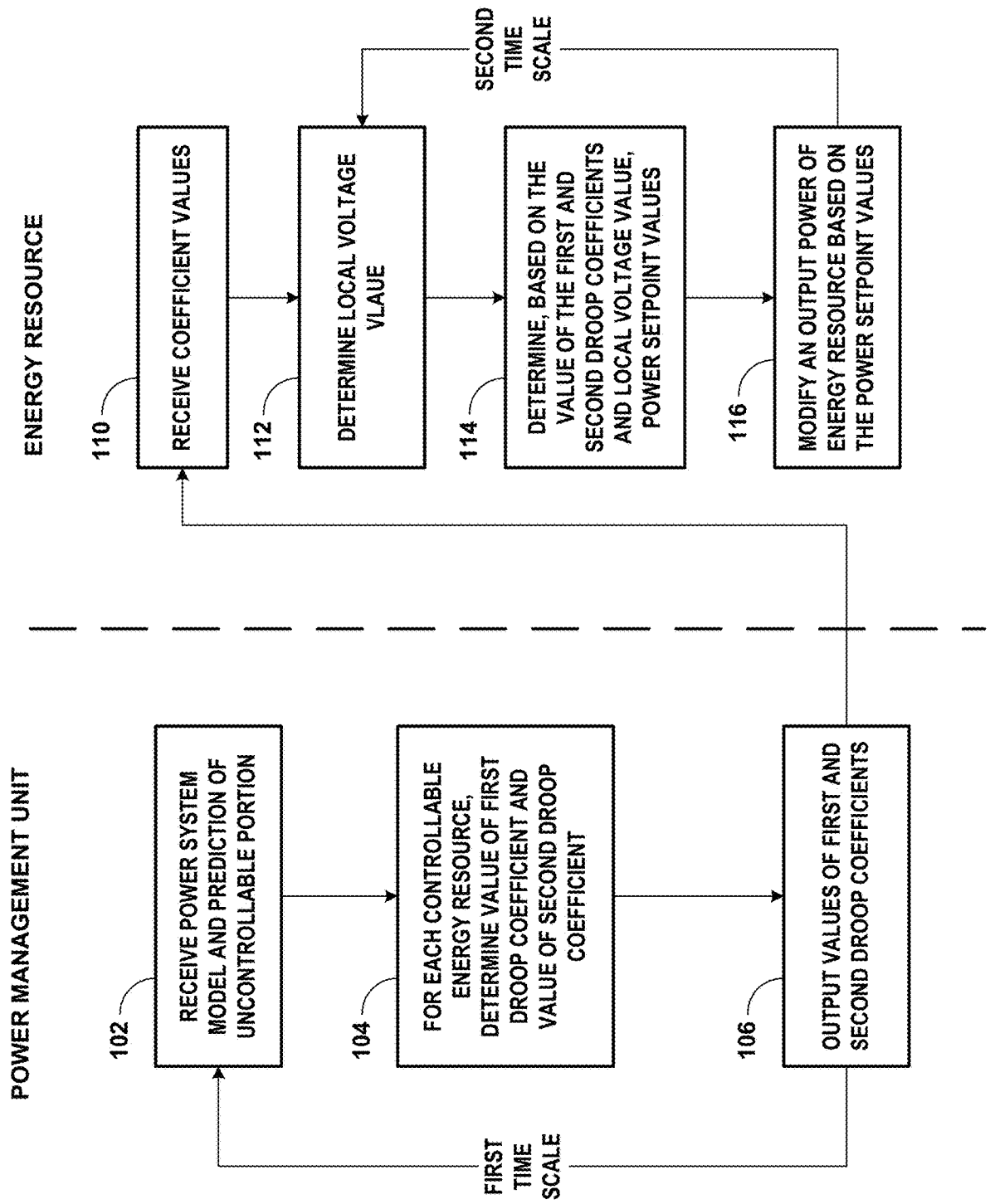
FIG. 2 is a flow diagram illustrating example operations for performing network-cognizant droop control, in accordance with one or more aspects of the present disclosure.

FIG. 2 is a flow diagram illustrating example operations for performing network-cognizant droop control, in accordance with one or more aspects of the present disclosure. FIG. 2 represents only one example process for performing real time feedback-based optimization of distributed energy resources as described herein, and various other or additional operations may be used in other examples. The example operations of FIG. 2 are described below within the context of FIG. 1.

In the example of FIG. 2, a power management unit may receive a power system model and a prediction of an uncontrollable portion of the power system (102). For instance, power management unit 4 may receive model 10 and prediction 12. In some examples, model 10 and/or prediction 12 may be received from one or more other devices. In some examples, model 10 and/or prediction 12 may be received from other modules or processes within power management unit 4. In some examples, power management unit 4 may generate or determine model 10 and/or prediction 12. That is, in various examples, power management unit 4 may obtain model 10 and prediction 12 in different ways.

In the example of FIG. 2, the power management unit may determine, for each controllable energy resource in the power system, a value of a first droop coefficient and a value of a second droop coefficient (104). For instance, power management unit 4 may determine coefficient values 14, which may include a set of droop coefficients for control device 6A and a set of droop coefficients for control device 6B. As detailed herein, power management unit 4 may determine the droop coefficients based at least in part on model 10 and prediction 12.

In the example of FIG. 2, the power management unit may output the values of the first and second droop coefficients (106). In other words, power management unit 4 may output coefficients 14, such as to control devices 6. As shown in the example of FIG. 2, the power management unit may perform operations 102, 104, and 106 on a first timescale. The first timescale may be every 5 minutes, every 15 minutes, or other appropriate amount of time for determining droop coefficients (e.g., via robust optimization).

In the example of FIG. 2, an energy resource may receive the coefficient values (110). For example, control devices 6 may receive coefficients 14 generated by power management unit 4. In some examples, control devices 6 may receive all coefficients 14. In other examples, control devices 6 may only receive their respective set of coefficients 14.

In the example of FIG. 2, the energy resource may determine a local voltage value (112). For example, control devices 6 may each determine their respective one of voltage values 16. Voltage values 16 may represent the respective voltage at the control device's connection point to the power system.

In the example of FIG. 2, the energy resource may determine, based on the value of the first and second droop coefficients and the local voltage value, power setpoint values (114). For example, control devices 6 may each determine respective power setpoint values based on the respective values of the first and second droop coefficient for the control device (e.g., contained in coefficients 14) and the respective one of voltage values 16.

In the example of FIG. 2, the energy resource may modify an output power of the energy resource based on the power setpoint values (116). For instance, based on the power setpoint values, control device 6A may reduce or increase the amount of reactive power being outputted by control device 6A and/or energy resource 8A. As another example, control device 6B may reduce or increase the amount of real power being outputted by control device 6B and/or one or more of energy resources 8B, 8C, or 8D.

As shown in the example of FIG. 2, the energy resource may perform operations 110, 112, 114, and 116 on a second timescale. The second timescale may be different from the first timescale. For example, the second timescale may be every 10 milliseconds, every 50 milliseconds, every second, or some other appropriate amount of time for modifying power setpoints and output powers. In other words, in some examples, energy resources may modulate output powers in real-time or near real-time while a power management system operates to update droop coefficients at a relatively slower scale (e.g., not in real-time or near real-time).

A centralized management unit operating to update droop coefficients using network structure and predictions of uncontrollable power injections may allow for more accurate network performance. To ensure stability, the management unit may update droop coefficients in a robust fashion, at a first timescale. DERs, on the other hand, may operate to update power setpoints and modulate output power at a second timescale, such as in real-time or near real-time, using up-to-date droop coefficients. This fast response may allow for more efficient and responsive network performance. The voltage-active power and voltage-reactive power characteristics used in the techniques described herein may be obtained based on the following design principles.

First, suitable linear approximations of the AC power-flow equations (e.g., as can be found in S. Guggilam et al., "Scalable optimization methods for distribution networks with high PV integration," *IEEE Transactions on Smart Grid*, 2016) are utilized to render the voltage-power characteristics of individual DERs network-cognizant. That is, the coefficients of the control techniques described herein account for the location of the DERs within the system, and for non-controllable loads/injections in the system and, consequently, DER controllers may, in essence, be aware of the effect of DER power adjustments on the overall voltage profile (rather than just the effect on the voltage at the point of interconnection of the DER).

Second, a robust design approach is utilized to cope with uncertainty in the forecasted non-controllable loads/power injections. That is, the droop coefficients are computed in the way that guarantees the optimality and stability of the system for all possible values of non-controllable loads/power injections.

Third, the control techniques are implemented to ensure a stable system operation, within a well-defined notion of input-to-state stability. In other words, it is ensured that the system state remains bounded for any bounded trajectory of the input to the system.

Based on these design guidelines, the coefficients of the proportional control techniques of the present disclosure may be obtained by solving a robust optimization problem. The optimization problem may be solved at regular time intervals (e.g., every hour, every few minutes, every 30 seconds, or another suitable frequency) so that the droop coefficients can be adapted to new operational conditions. The optimization problem can accommodate a variety of performance objectives, including minimizing voltage deviations from a given profile, maximizing stability margins, individual consumer objectives (e.g., maximizing active power production), and others. By utilizing sparsity-promoting regularization functions, the techniques of the present disclosure also allow for selection of subsets of locations where Volt/VAR/Watt control is critical to ensure voltage control. The framework detailed herein subsumes existing Volt/VAR control as it provides backwards compatibility through simply forcing the Volt/Watt coefficients to zero in the optimization problem.

In the present disclosure, upper-case and lower-case boldface letters will be used for matrices and column vectors, respectively. Transposition will be denoted by $(\cdot)^T$ and the absolute value of a number or the cardinality of a set will be denoted by $|\cdot|$. Let $\mathcal{A} \times \mathcal{B}$ denote the Cartesian product of sets $\mathcal{A}$ and $\mathcal{B}$. For a given N×1 vector $x \in \mathbb{R}^N$, $\|x\|_2 := \sqrt{x^H x}$; $\|x\|_\infty := \max(|x_1| \ldots |x_n|)$; and diag(x) returns a N×N matrix with the elements of x in its diagonal. The spectral radius $\rho(\cdot)$ is defined for an N×N matrix A and corresponding eigenvalues $\lambda_1 \ldots \lambda_N$ as $\rho(A) := \max(|\lambda_1| \ldots |\lambda_n|)$. For an M×N matrix A, the Frobenius norm is defined as $\|A\|_F = \sqrt{Tr(A^*A)}$ and the spectral norm is defined as $\|A\|_2 := \sqrt{\lambda_{max}(A^*A)}$, where $\lambda_{max}$ denotes maximum eigenvalue. Finally, $I_N$ denotes the N×N identity matrix.

As one example system model, consider a distribution system comprising N+1 nodes collected in the set $\mathcal{N} \cup \{0\}$, $\mathcal{N} := \{1, \ldots, N\}$. Node 0 is defined to be the distribution substation. Let $v_n$ denote the voltage at node $n=1, \ldots, N$ and let $v := [|v_1|, \ldots, |v_N|]^T \in \mathbb{R}^N$ denote the vector collecting the voltage magnitudes.

Under certain conditions, the non-linear AC power-flow equations can be compactly written as $$v = F(p,q), \quad (1)$$

where $p \in \mathbb{R}^N$ and $q \in \mathbb{R}^N$ are vectors collecting the net active and reactive power injections, respectively, at nodes $n=1 \ldots N$. The existence of the power-flow function F is related to the question of existence and uniqueness of the power-flow solution and has been established in the literature under different conditions. In the present disclosure, F is used only to analyze the stability of the control techniques described herein, and thus (1) can be considered as a "black box" representing the reaction of the power system to the net active and reactive power injections (p,q). In fact, this view does not require uniqueness of the power-flow solution by allowing the function F to be time-dependent.

Nonlinearity of the AC power-flow equations poses significant challenges with regards to solving problems such as optimal power flow as well as the design of the proposed decentralized control strategies for DERs. Thus, to facilitate the design of the control techniques, linear approximations of (1) are utilized herein. In particular, consider a linear relationship between voltage magnitudes and injected active and reactive powers of the following form:

$$v \approx F_L(p,q) = Rp + Bq + a. \quad (2)$$

System-dependent matrices $R \in \mathbb{R}^{N \times N}$, $B \in \mathbb{R}^{N \times N}$, and vector $a \in \mathbb{R}^N$ can be computed in a variety of ways:
i) Utilizing suitable linearization methods for the AC power-flow equations, applicable when the network model is known; and,
ii) Using regression-based methods, based on real-time measurements of v, p, and q. E.g., the recursive least-squares method can be utilized to continuously update the model parameters.

For notational and expositional simplicity, the framework is described herein with respect to a balanced distribution network. However, the control techniques of the present disclosure are applicable to multi-phase unbalanced systems with any topology. In fact, the linearized model (2) can be readily extended to the multi-phase unbalanced setup, and the design procedure outlined in the ensuing section can be utilized to compute the Volt/VAR/Watt characteristics of devices located at any node and phase.

The approach for determining the coefficients used in the droop control techniques for active and reactive power described herein may be outlined as follows:

Optimal droop control techniques design: on a slow time-scale (e.g., every 5-15 minutes), compute the coefficients for use in the droop control techniques based on the knowledge of the network, with the objective of minimizing voltage deviations while keeping the system stable.

Real-time operation: on a fast time-scale (e.g., subsecond), adjust active and reactive powers of DERs locally, based on the recently computed coefficients.

To formulate the problem, consider a discrete-time decision problem of adjusting active and reactive power setpoints during real-time operation in response to local changes in voltage magnitudes. Let $k=1, 2, \ldots$ denote the time-step index, and let the voltage magnitudes at time step k be expressed as $$v(k) = F(p(k) + \Delta p(k), q(k) + \Delta q(k)), \quad (3)$$

where p(k) and q(k) are the active and reactive powers setpoints, respectively, throughout the feeder and $\Delta p(k)$ and $\Delta q(k)$ are the vectors of active and reactive power adjustments of the Volt/VAR/Watt controllers. Also, consider a given power-flow solution $\bar{v}$, $\bar{p}$, and $\bar{q}$ satisfying (1) and (2). The triple ($\bar{v}$, $\bar{p}$, $\bar{q}$) can be viewed as a reference power-flow solution (e.g., a linearization point of (2)). Finally, let $\Delta v(k) := v(k) - \bar{v}$ denote the voltage deviation from $\bar{v}$.

The objective is to design techniques that can be implemented to form a decentralized proportional real-time control device that updates $\Delta p(k)$ and $\Delta q(k)$ in response to $\Delta v(k-1)$. That is, the candidate adjustments are given by $$\Delta \tilde{p}(k) = G_p \Delta v(k-1), \quad \Delta \tilde{q}(k) = G_q \Delta v(k-1), \quad (4)$$

where $G_p$ and $G_q$ are diagonal N×N matrices collecting the coefficients of the proportional control techniques. The change in active power output at node n in response to a change in voltage at node n is then given by each on-diagonal element in $G_p$, $g_{p,n} := (G_p)_{nn}$, $n=1, \ldots, N$; and the change in reactive power output at node n in response to a change in voltage at node n is given by each on-diagonal element in $G_q$, $g_{q,n} := (G_q)_{nn}$, $n=1, \ldots, N$.

However, due to inverter operational constraints, setting $\Delta p(k)=\Delta \tilde{p}(k)$ and $\Delta p(k)=\Delta \tilde{q}(k)$ may not be feasible. This is accounted for by projecting the candidate setpoint onto the feasible set. To this end, let $\mathcal{Y}_n(k)$ be the set of feasible operating points for an inverter located at node n at time step k. For example, for a PV inverter with rating $S_n$ and an available power $P_{av,n}(k)$, the set $\mathcal{Y}_n(k)$ is given by $\mathcal{Y}_n(k)=\{(P_n, Q_n): 0 \leq P_n \leq P_{av,n}(k), Q_n^2 \leq S_n^2 - P_n^2\}$. Notice that, for PV inverters, the set $\mathcal{Y}_n(k)$ is convex, compact, and time-varying (it depends on the available power $P_{av,n}(k)$).

From (4), a new potential setpoint for inverter n is generated as $\tilde{P}_n(k):=P_n(k)+g_{p,n}\Delta V_n(k-1)$, and $\tilde{Q}_n(k):=Q_n(k)+g_{q,n}\Delta V_n(k-1)$. If $(\tilde{P}_n(k), \tilde{Q}_n(k)) \notin \mathcal{Y}_n(k))$, then a feasible setpoint is obtained as:

$$(\hat{P}_n(k), \hat{Q}_n(k))=\text{proj}_{\mathcal{Y}_n(k)}\{\tilde{P}_n(k), \tilde{Q}_n(k)\}) \quad (5)$$

where $$\text{proj}\{z\} \atop \mathcal{Y} \quad \quad \quad \quad \quad \quad \quad \quad \quad \quad$$

denotes the projection of the vector z onto the convex set $\mathcal{Y}$. For typical systems such as PV or battery, the projection operation in (5) can be computed in closed form. In general, the set $\mathcal{Y}_n(k)$ can be approximated by a polygon, and efficient numerical methods can be applied to compute the next projection.

Conditions under which the control techniques of the present disclosure are stable in a well-defined sense, as well as how these stability conditions can be used to design optimal control coefficients $G_p$, $G_q$ for use with the control techniques, are described below.

To verify stability, the input-to-state stability properties of the control techniques described herein may be analyzed by making reference to a given linear model (2). To that end, the following assumption is made.

Assumption 1.

The error between the linear model (2) and the exact power-flow model (1) is bounded, namely there exists $\delta < \infty$ such that $\|F(p,q)-F_L(p,q)\|_2 \leq \delta$ for all (feasible) p and q.

For future developments, let $G:=[G_p, G_q]^T$ be a $2N \times N$ matrix composed of two stacked $N \times N$ diagonal matrices $G_p$ and $G_q$. Also, let $\bar{z}=[\bar{p}^T, \bar{q}^T]^T$, and $\Delta p_{nc}(k):=p(k)-\bar{p}$ and $\Delta q_{nc}(k):=q(k)-\bar{q}$ denote the deviation of the uncontrollable powers at time step k from the nominal value. Let the matrix H and the vector $\Delta z_{nc}(k)$ be defined as $H:=[R, B]$ and $\Delta z_{nc}(k):=[\Delta p_{nc}(k)^T, \Delta q_{nc}(k)^T]^T$, where (R, B) are the parameters of the linear model (2). Finally, let $\Delta z_{nc}(k):=[\Delta p_{nc}(k)^T, \Delta q_{nc}(k)^T]^T$ denote the controllable change in active and reactive power of each inverter.

Let $\mathcal{Y}(k):=\mathcal{Y}_1(k) \times \ldots \times \mathcal{Y}_N(k)$ be the aggregate compact convex set of feasible setpoints at time step k. Also, let $$\mathcal{D}(k):=\{\Delta z: z(k)+\Delta z \in \mathcal{Y}(k)\} \quad (6)$$

denote the set of feasible Volt/VAR/Watt adjustments, where $z(k)=[p(k)^T, q(k)^T]^T$ denotes the power setpoint at time step k before the Volt/VAR/Watt adjustment. It is easy to see that $\mathcal{D}(k)$ is a convex set as well, and that the projected Volt/VAR/Watt controller (5) is equivalently defined by $$\Delta z(k) = \text{proj}_{\mathcal{D}(k)}(G\Delta v(k-1)). \quad (7)$$

Recall that $\bar{v}=F(\bar{p},\bar{q})=F_L(\bar{p},\bar{q})$. The dynamical system imposed by (3), (4), and (7) is then given by $$\Delta v(k) = F(z(k) + \text{proj}_{\mathcal{D}(k)}(G\Delta v(k-1))) - F_L(\bar{p}, \bar{q}). \quad (8)$$

The following result provides a condition for stability of (8) in terms of the parameters of the linear model H and the controller coefficients G.

Theorem 1.

Suppose that Assumption 1 holds. Also assume that $r:=\|GH\|_2<1$ and that $\|\Delta z_{nc}(k)\|_2 \leq C$ for all k. Then $$\limsup_{k\to\infty} \|\Delta v(k)\|_2 \leq \frac{\|H\|_2 C + (1-r+\|G\|_2\|H\|_2)\delta}{1-r}.$$

Proof.

Let $\hat{z}(k):=z(k)+\text{proj}_{\mathcal{D}(k)}(G\Delta v(k-1))$. We have that $$\|\Delta v(k)\|_2 \leq \|F_L(\hat{z}(k))-F_L(\bar{z})\|_2 + \|F_L(\hat{z}(k))-F(\hat{z}(k))\|_2 \leq \|H\Delta z_{nc}(k)+H\text{proj}_{\mathcal{D}(k)}(G\Delta v(k-1))\|_2+\delta \leq \|H\|_2 C+\|H\|_2\|\text{proj}_{\mathcal{D}(k)}(G\Delta v(k-1))\|_2+\delta \leq \|H\|_2 C+\|H\|_2\|G\Delta v(k-1)\|_2+\delta \quad (9)$$

where the second inequality follows by Assumption 1 and the definition of the linear model (2), the third inequality holds by the hypothesis that $\|\Delta z_{nc}(k)\|_2 \leq C$, and in the last inequality the non-expansive property of the projection operator was used; in particular, as $0 \in \mathcal{D}(k)$ for all k, we have that $\|\text{proj}_{\mathcal{D}(k)}(x)\|_2 \leq \|x\|_2$ for all k and any x.

Next, a bound on $\|G\Delta v(k-1)\|_2$ may be obtained. Similarly to the derivation in (9), it holds that $$\|G\Delta v(k)\|_2 \leq \|GH\Delta z_{nc}(k)+GH\text{proj}_{\mathcal{D}(k)}(G\Delta v(k-1))\|_2 + \|G\|_2\delta \leq \|GH\|_2 C+\|GH\|_2\|\text{proj}_{\mathcal{D}(k)}(G\Delta v(k-1))\|_2+\|G\|_2\delta \leq rC+r\|G\Delta v(k-1)\|_2+\|G\|_2\delta. \quad (10)$$

By applying (10) recursively, the following is obtained $$\|G\Delta v(k)\|_2 \leq (rC+\|G\|_2\delta)\sum_{i=0}^{k-1} r^i + r^k\|G\Delta v(0)\|_2 = (rC+\|G\|_2\delta)\frac{1-r^k}{1-r}+r^k\|G\Delta v(0)\|_2 \quad (11)$$

Now, plugging (11) in (9) yields $$\|\Delta v(k)\|_2 \leq \|H\|_2 C + \|H\|_2\left((rC+\|G\|_2\delta)\frac{1-r^k}{1-r}+r^k\|G\Delta v(0)\|_2\right)+\delta.$$

The proof is then completed by taking lim sup and rearranging.

Remark 2.

It is of note that Theorem 1 establishes bounded-input-bound-state (BIBS) stability. Indeed, it states that under the condition $\|GH\|_2<1$, the state variables $\Delta v(k)$ remains bounded whenever the input sequence $\{\Delta z_{nc}(k)=z(k)-\bar{z}\}$ is bounded. Also, observe that the result of Theorem 1 does not depend on the particular linearization method, as long as it satisfies Assumption 1.

An optimal design of droop coefficients $G:=[G_p, G_q]^T$ with the objective of minimizing voltage deviations while keeping the system stable is now described. For the purpose of the design, the following simplifications may be made:

(i) A linear power-flow model (2) is considered, instead of the exact one (1);

(ii) The projection in the update portion of the control techniques is ignored.

Based on these two simplifications, the following linear dynamical system for voltage deviations is obtained (cf. the exact non-linear dynamical system (8)):

$$\Delta \tilde{v}(k) = H\Delta v_{nc}(k) + H\Delta z(k) \quad (12)$$
$$= H\Delta z_{nc}(k) + HG\Delta \tilde{v}(k-1).$$

Note that under the condition $\|GH\|_2 < 1$ of Theorem 1, $\rho(HG) = \rho(GH) \le \|GH\|_2 < 1$. Thus, from standard analysis in control of discrete-time linear systems, the system (12) is stable as well.

To design the control techniques of the present disclosure, a forecast $\mu$ for $\Delta z_{nc}(k)$ is assumed to be available. In particular, in the present disclosure, $\mu$ is computed from the history by averaging over the interval between two consecutive droop coefficient adjustments. However, other suitable forecasting methods may be used as well. Thus, define the following modified dynamical system that employs $\mu$:

$$e(k+1) = HGe(k) + H\mu \quad (13)$$

Note that as $\rho(HG) < 1$, the system (13) converges to the unique solution of the fixed-point equation $$e = HGe + H\mu$$

given by $$e^* = (I - HG)^{-1}H\mu.$$

Moreover, if the forecast $\mu$ is accurate enough, namely $\|\Delta z_{nc}(k) - \mu\|_2 \le \varepsilon$ for some (small) constant $\varepsilon$ and all k, then using the method of proof of Theorem 1 it can be shown that $$\limsup_{k \to \infty} \|\Delta \tilde{v}(k) - e^*\|_2 \le \frac{K\varepsilon}{1 - \rho(HG)}$$

for some constant $K < \infty$, implying that minimizing $e^*$ also asymptotically minimizes $\Delta \tilde{v}(k)$.

Hence, the goal in general is to design control techniques G that may be implemented to solve the following optimization problem:

$$(P0) \inf_{G,e} f(e, G) \quad (14a)$$

subject to $$e = (I - HG)^{-1}H\mu \quad (14b)$$
$$\|GH\|_2 < 1 \quad (14c)$$

for some convex objective function $f(e, G)$. However, this problem cannot be practically solved mainly due to: (i) non-linear equality constraint (14b) and (ii) the fact that (14c) defines an open set. To address problem (i), the first two terms of the Neuman series of a matrix can be used:

$$(I - HG)^{-1}H\mu \approx (I - HG)H\mu. \quad (15)$$

To address problem (ii), the strict inequality (14c) can be converted to inequality and included in an optimization problem by including a stability margin $\varepsilon \ge \varepsilon_0$ such that $$\|GH\|_2 \le 1 - \varepsilon \quad (16)$$

where $\varepsilon_0 > 0$ is a desired lower bound on the stability margin. Finally, to further simplify this constraint, the induced $l_2$ matrix norm may be upper bounded with the Frobenius norm.

Thus, (P0) is reformulated as the following:

$$(P1) \min_{G,e,\varepsilon} f(e, G, \varepsilon) \quad (17a)$$

subject to $$e = (I + HG)H\mu \quad (17b)$$
$$\|GH\|_F \le 1 - \varepsilon, i = 1, \ldots, N \quad (17c)$$
$$\varepsilon_0 \le \varepsilon \le 1 \quad (17d)$$
$$G \le 0 \quad (17e)$$

where (17e) ensures that each of the resulting coefficients are non-positive. As a first formulation of (P1), consider minimizing the voltage deviation while providing enough stability margin, by defining the following objective function $$f(e, G, \varepsilon) = \|e\|_\infty - \gamma\varepsilon, \quad (18)$$

where $\gamma \ge 0$ is a weight parameter which influences the choice of the size of the stability margin $\varepsilon$. The infinity norm in this particular example was chosen in order to minimize the worst case voltage deviation in the system.

The optimization problem formulated herein assumes that a forecast $\mu$ is available, and a certainty equivalence formulation is derived. However, the predictions of fluctuations in active and reactive power at each node are in general uncertain, and choosing droop coefficients for a particular $\mu$ may result in suboptimality. Thus, this section assumes that the uncontrollable variables $\{\Delta z_{nc}(k)\}$ belong to a polyhedral uncertainty set u (e.g., prediction intervals), and formulates the robust counterpart of (P1), which results in a convex optimization program.

Start by developing an approximation of the form (15) for this case. To that end, the exact expression for $\Delta \tilde{v}(k)$ from (12) can be written as:

$$\Delta \tilde{v}(k) = H\Delta z_{nc}(k) + HGH\Delta z_{nc}(k-1) + O((GH)^2). \quad (19)$$

Next, make the following two approximations:
(i) Neglect the terms $O((GH)^2)$. This is justified similarly to the Neuman series approximation (15) under the condition that $\rho(GH) < 1$.
(ii) Assume that the control techniques are performed fast enough so that the variability of the uncontrollable variables in two consecutive Volt/VAR/Watt adjustment steps is negligible. Namely, assume that $\Delta z_{nc}(k) \approx \Delta z_{nc}(k-1)$.

Thus, $\Delta v(k)$ is approximated as $$(I + HG)H\mu \quad (20)$$

for some $\mu \in \mathcal{U}$; cf. (15).

Next, proceed to define a robust optimization problem that minimizes the $l_\infty$ norm of (20) for the worst-case realization of $\mu \in \mathcal{U}$. Define $A(G) = (I + HG)H$ and rewrite the problem in epigraph form so that the uncertainty is no longer in the objective function:

$$(P2) \min_{G,\varepsilon,t} t - \gamma\varepsilon \quad (21a)$$

subject to

-continued $$\max_{\mu \in \mathcal{U}} \|A(G)\mu\|_\infty \le t \quad (21b)$$

(17c), (17d), (17e)

where $\mathcal{U} = \{\mu: D\mu \le d\}$ for matrix D and vector d of appropriate dimensions. The inner maximization problem can equivalently be written as the following set of constraints:

$$\max_{\mu \in \mathcal{U}} \left| \sum_{j=1}^{n} A_{i,j}(G)\mu_j \right| \le t, \forall i = 1 \ldots n \quad (22)$$

Splitting the absolute value into two separate optimization problems, the following constraints are obtained:

$$\left( \max_{\mu \in \mathcal{U}} \sum_{j=1}^{n} A_{i,j}(G)\mu_j \right) \le t, \forall i = 1 \ldots n \quad (23a)$$

$$\left( \max_{\mu \in \mathcal{U}} -\sum_{j=1}^{n} A_{i,j}(G)\mu_j \right) \le t, \forall i = 1 \ldots n \quad (23b)$$

To formulate the final convex robust counterpart of (P1), the dual problems of (23a) and (23b) are sought. For clarity, define $a_i^T$ as the ith row of A. Since G is not an optimization variable in the inner maximization problems, the dual problems for (23a) and (23b) can be written as follows:

Dual Problem of (23a):

$$\max_\mu a_i^T \mu \Leftrightarrow \min_{\overline{\lambda}_i \ge 0} \overline{\lambda}_i^T d$$
$$\text{s.t. } D\mu \le d \quad \text{s.t. } D^T \overline{\lambda}_i = a_i$$

Dual Problem of (23b):

$$\max_\mu a_i^T \mu \Leftrightarrow \min_{\underline{\lambda}_i \ge 0} \underline{\lambda}_i^T d$$
$$\text{s.t. } D\mu \le d \quad \text{s.t. } D^T \underline{\lambda}_i = -a_i$$

for all i=1 . . . n. Finally, the resulting robust counterpart can be written as follows:

$$(P2) \min_{G,\epsilon,t,\lambda} t - \gamma \epsilon$$

subject to $$\overline{\lambda}_i^T d \le t, \forall i = 1 \ldots n$$
$$\underline{\lambda}_i^T d \le t, \forall i = 1 \ldots n$$
$$D^T \overline{\lambda}_i = a_i(G), \forall i = 1 \ldots n$$
$$D^T \underline{\lambda}_i = -a_i(G), \forall i = 1 \ldots n$$
$$\underline{\lambda}_i, \overline{\lambda}_i \ge 0, \forall i = 1 \ldots n$$

(17c), (17d), (17e)

and $\lambda = [\overline{\lambda}_1^T, \underline{\lambda}_1^T, \ldots \overline{\lambda}_n^T, \underline{\lambda}_n^T]^T$. Recalling that $a_i(G)$ is a linear function of the elements of $G_p$ and $G_q$, it can be seen that the resulting robust counterpart (P2) is convex.

The effectiveness of droop control depends on the location of the inverter in the network. For example, in areas of the feeder with a high X/R ratio, Volt/VAR control can prove to be more effective. However, due to this location dependency, the optimization problem considered in (P2) could, for example, lead to a situation where particular inverters participate more often or at a higher participation level than other inverters. In addition, if each inverter is voluntarily participating and being compensated for its contribution to voltage support, certain consumers may wish to penalize contribution of active power more than reactive power and have their own individual objectives, or choose not to participate at all during certain times of the day. Thus, in some examples, it may be beneficial to provide an objective that allows for the Volt/VAR and Volt/Watt coefficients to be penalized differently at each individual inverter. Consider the following objective:

$$f(e, G, \epsilon) = \|e\|_\infty - \gamma\epsilon + G_p^T M_p G_p + G_q^T M_q G_q \quad (25)$$

where matrices $M_p$ and $M_q$ are diagonal and positive semidefinite weighting matrices that penalize the contribution of active and reactive power, respectively, from each inverter.

Communication limitations, planning considerations, and other motivating factors could influence the number of DERs that are installed in a certain area of the grid, or that are actively performing droop control within any given time interval. To consider this objective, the sparsity of the matrices $G_p$ and $G_q$ may be of interest. This can be achieved by minimizing the cardinality of the diagonals of these matrices. However, the cardinality function yields a combinatorial optimization formulation which may result in an intractable optimization problem. An alternative is to use a convex relaxation of the cardinality function, the $l_1$ norm, where $\|x\|_1 = \sum_{i=1}^{N} |x_i|$. Thus, the objective function in this case, simultaneously considering minimizing voltage deviations and sparsity, is the following:

$$f(e, G, \epsilon) = \|e\|_\infty - \gamma\epsilon + \eta_p \|\text{diag}(G_p)\|_1 + \eta_q \|\text{diag}(G_q)\|_1 \quad (26)$$

Where the diag(•) operator takes the on-diagonal elements of an n×n matrix and creates a n×1 vector composed of these elements. The weighting parameters $\eta_p$ and $\eta_q$ can be individually tuned to achieve the desired level of sparsity for both $G_p$ and $G_q$ (the bigger $\eta_p$ and $\eta_q$, the more sparse these matrices will be).

What follows is a discussion of the modified IEEE 37-node test case and simulation results for the objectives considered in (18), (25), and (26) under the robust framework disclosed herein.

The IEEE 37 node test system was used for the simulations, with 21 PV systems located at nodes 4, 7, 9, 10, 11, 13, 16, 17, 20, 22, 23, 26, 28, 29, 30, 31, 32, 33, 34, 35, and 36. One-second solar irradiance and load data taken from distribution feeders near Sacramento, Calif., during a clear sky day on Aug. 1, 2012 (obtained from J. Bank et al., "Development of a high resolution, real time, distribution-level metering system and associated visualization modeling, and data analysis functions," National Renewable Energy Laboratory, Tech. Rep. NREL/TP-5500-56610, May 2013) was used as the PV/Load inputs to the control techniques.

Figure 3A:
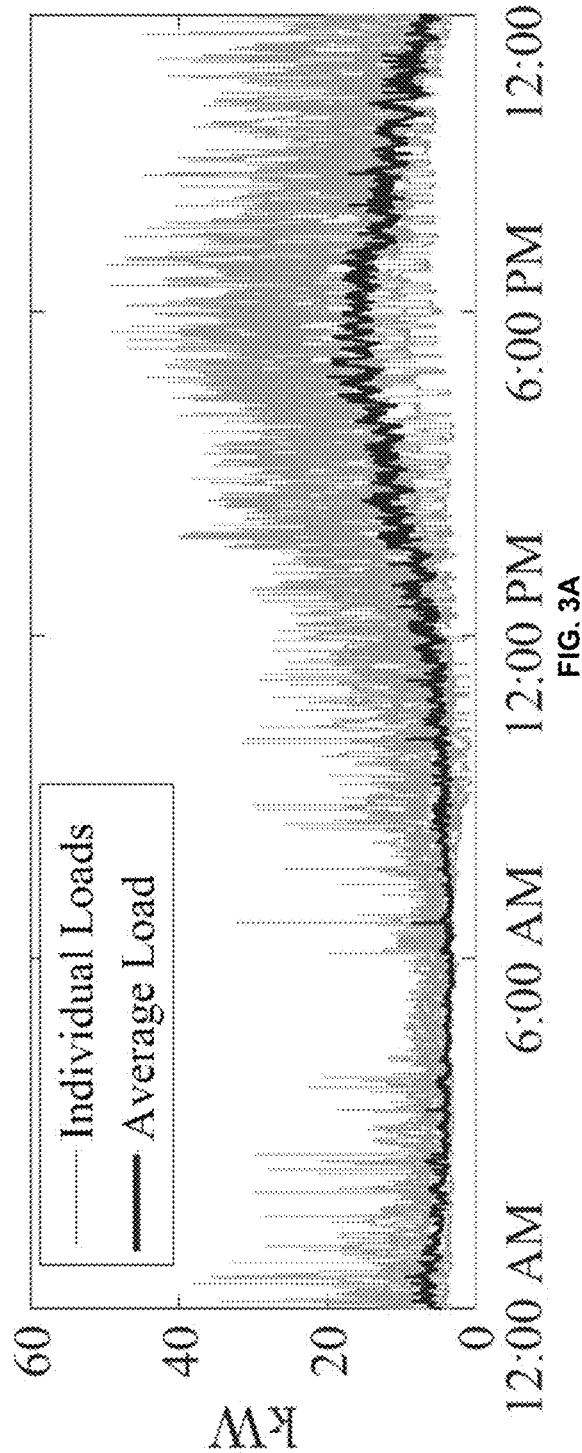
FIGS. 3A and 3B are graphical plots illustrating example results of implementing network-cognizant droop control on a simulated device, in accordance with one or more aspects of the present disclosure.
Figure 3B:
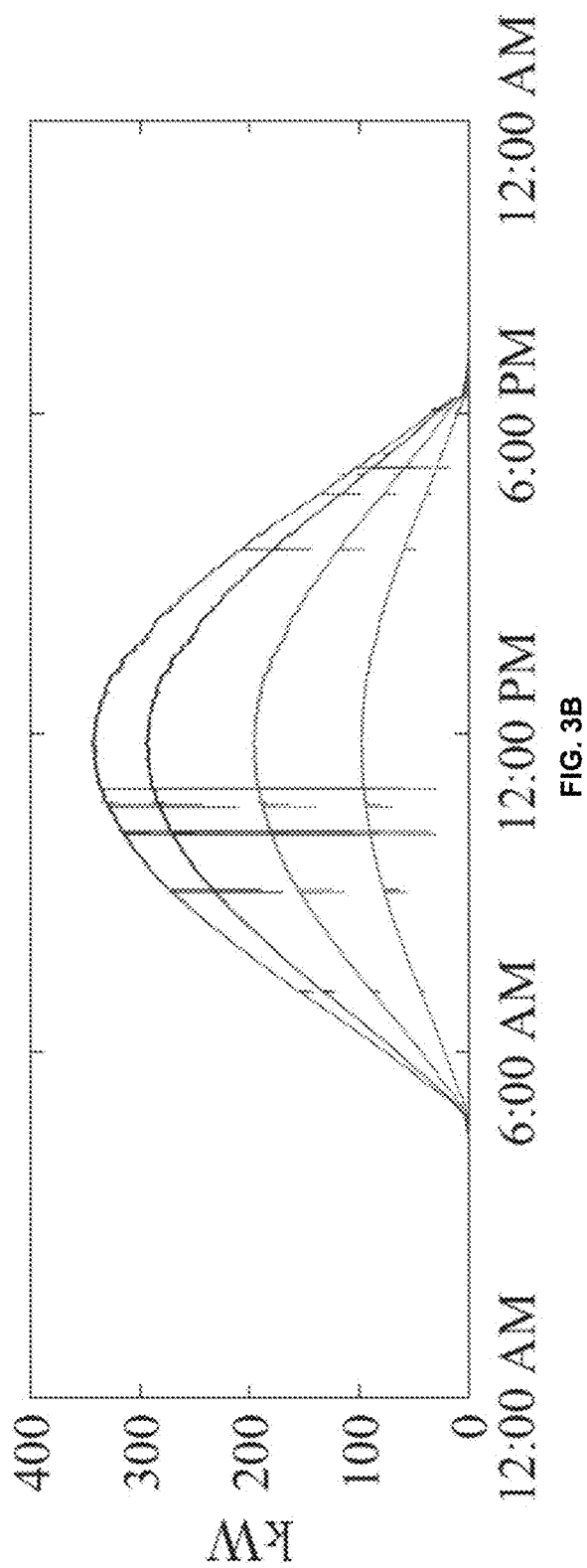

FIGS. 3A and 3B are graphical plots illustrating example results of implementing network-cognizant droop control on a simulated device, in accordance with one or more aspects of the present disclosure. Specifically, FIG. 3A shows one-second data for the active power load at each node and FIG. 3B shows one-second data for the available solar generation at each inverter. The stability margin parameter $\epsilon_0$ was set to $1^{-3}$, and $\lambda=0.01$. After the optimal settings for the control techniques were determined using the linearized power flow model, the deployed control techniques were simulated using the actual nonlinear AC power flows in MATPOWER (as described in R. D. Zimmerman, et al., "Matpower: Steady-state operations, planning, and analysis tools for power systems research and education," *IEEE Trans. On Power Systems*, vol. 26, no. 1, pp. 12-19, February 2011). The uncertainty set for the expected value of the real and reactive power fluctuations, $\mathcal{U}$, was taken to be an interval with bounds on the maximum and minimum forecasted value for the power at each node over the upcoming control period.

Figure 4A:
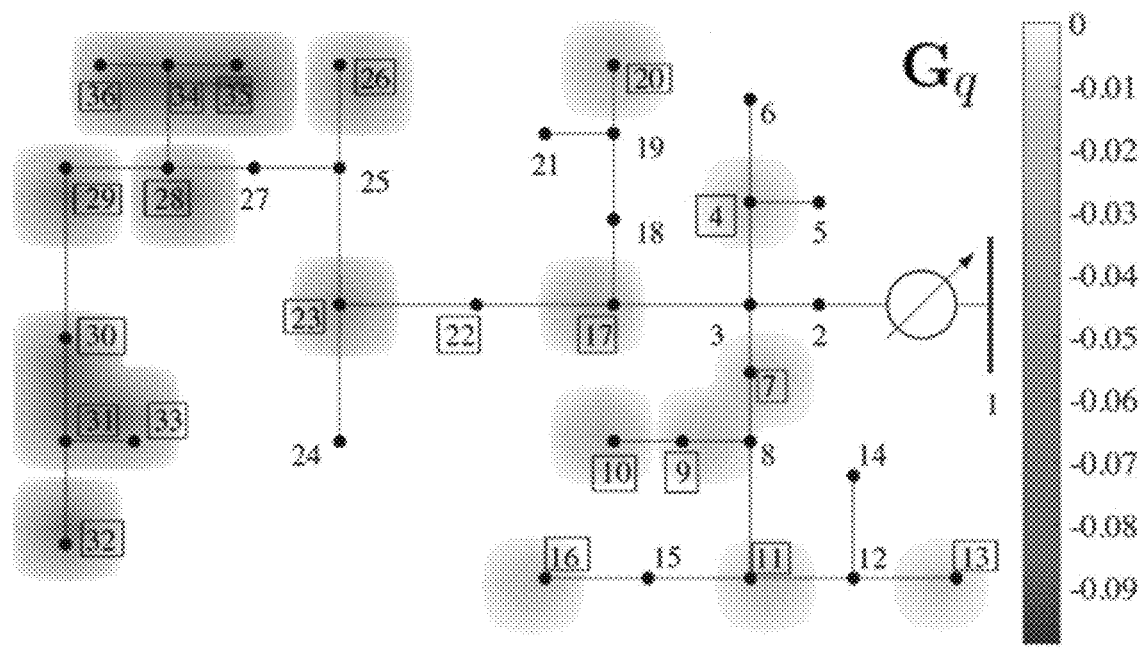
FIGS. 4A and 4B are network diagrams illustrating example results of implementing network-cognizant droop control on the modified IEEE 37-node distribution test feeder, in accordance with one or more aspects of the present disclosure.
Figure 4B:
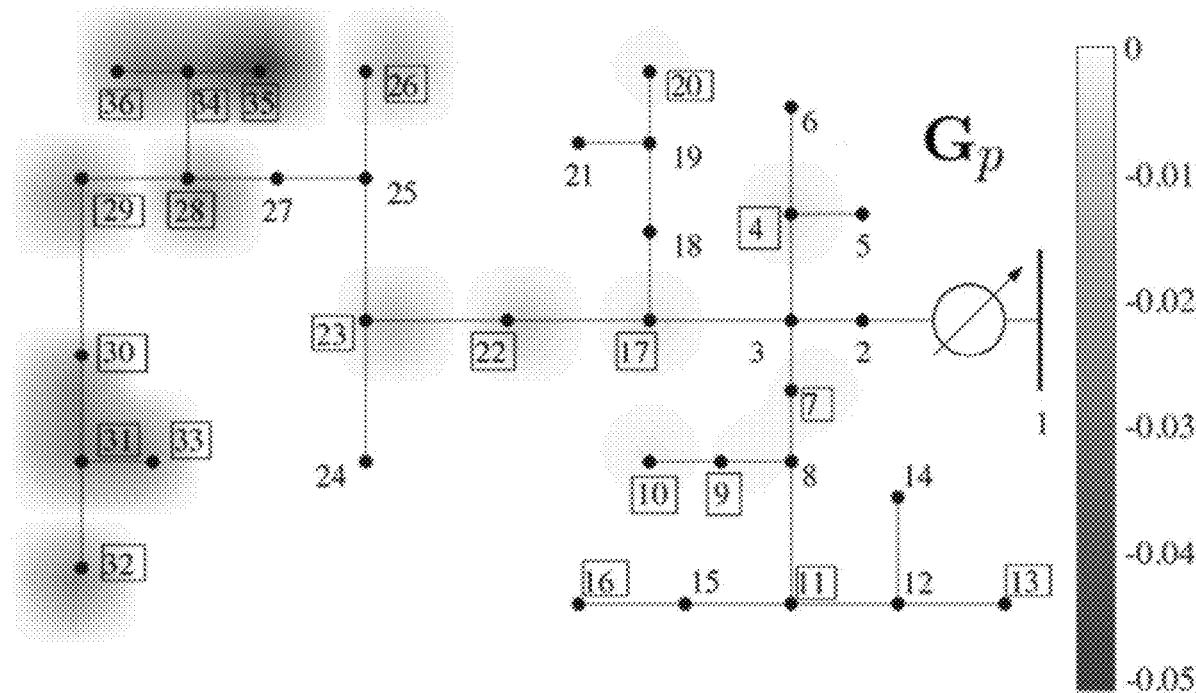

FIGS. 4A and 4B are network diagrams illustrating example results of implementing network-cognizant droop control on the modified IEEE 37-node distribution test feeder, in accordance with one or more aspects of the present disclosure. As demonstrated below, the optimal solution for the droop control techniques is heavily location dependent. The following simulations were performed by choosing an objective that minimizes both voltage deviations and active power contribution (objective (25) with $M_q=0$ and $M_p=c \cdot I$; i.e., each inverter has equal penalty for Volt/Watt coefficients). The distribution test feeder depicted in FIGS. 4A and 4B are overlaid with heatmaps that illustrate the average magnitude of the desired droop settings for both Volt/VAR and Volt/Watt, respectively, over four 15-minute control periods (11:00 AM-12:00 PM). The higher magnitude of coefficients and thus increased voltage control towards the leaves of the feeder, as shown in FIGS. 4A and 4B, is consistent with related-art research that has also found that voltage control can be most impactful when DERs are located near the end of distribution feeders.

Figure 5A:
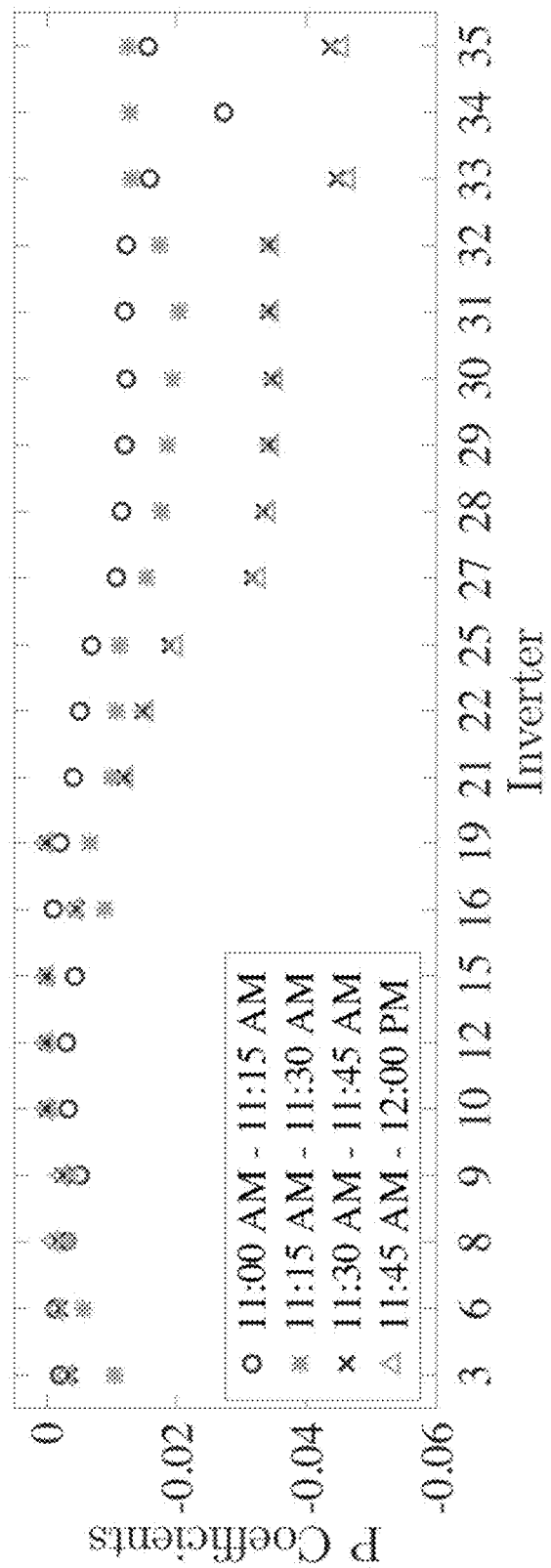
FIGS. 5A and 5B are graphical plots illustrating coefficients for inverters in a modified IEEE 37-node distribution test feeder implementing network-cognizant droop control, in accordance with one or more aspects of the present disclosure.
Figure 5B:
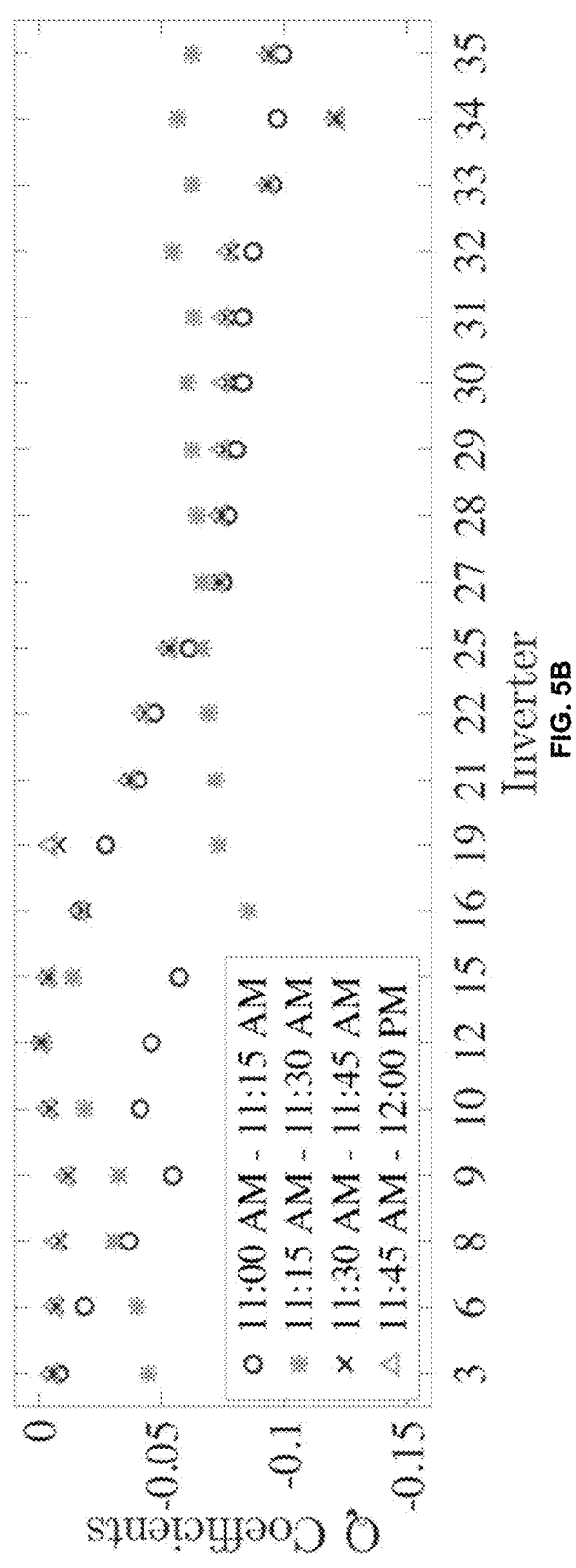

FIG. 5 is a set of graphical plots illustrating coefficients for inverters in a modified IEEE 37-node distribution test feeder implementing network-cognizant droop control, in accordance with one or more aspects of the present disclosure. Specifically, in FIG. 5, the Volt/VAR and Volt/Watt coefficients are plotted for each inverter and each 15-minute control period. As shown in FIG. 5, as the time approaches noon (i.e. as solar irradiance increases), the impact of active power control on mitigating voltage issues increases, as seen by the increase in Volt/Watt coefficients. Despite the penalty term in the objective on Volt/Watt coefficients and no penalty on Volt/VAR coefficients, active power control is still useful for voltage control in distribution networks due to the highly resistive lines and low X/R ratio.

Figure 6A:
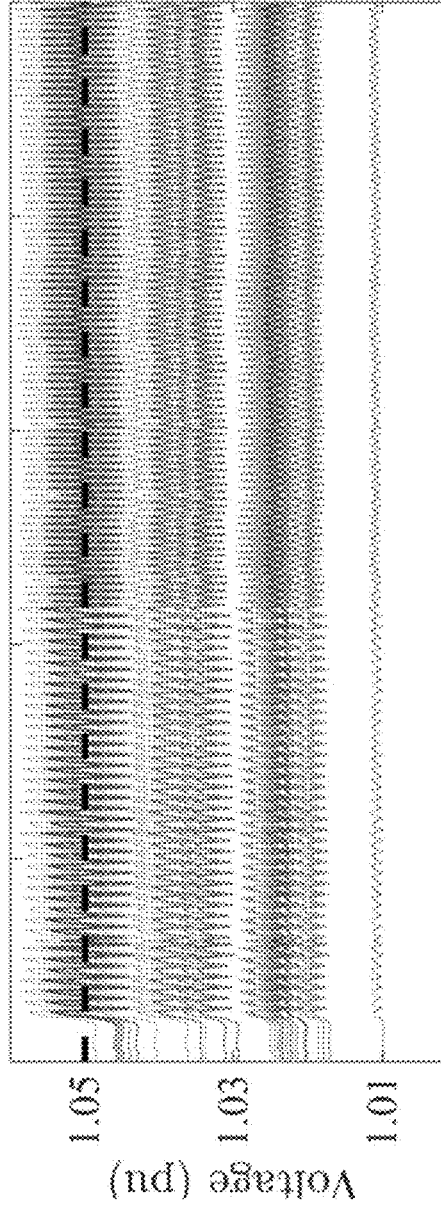
FIGS. 6A and 6B are graphical plots illustrating additional simulation results of network-cognizant droop control, in accordance with one or more aspects of the present disclosure.
Figure 6B:
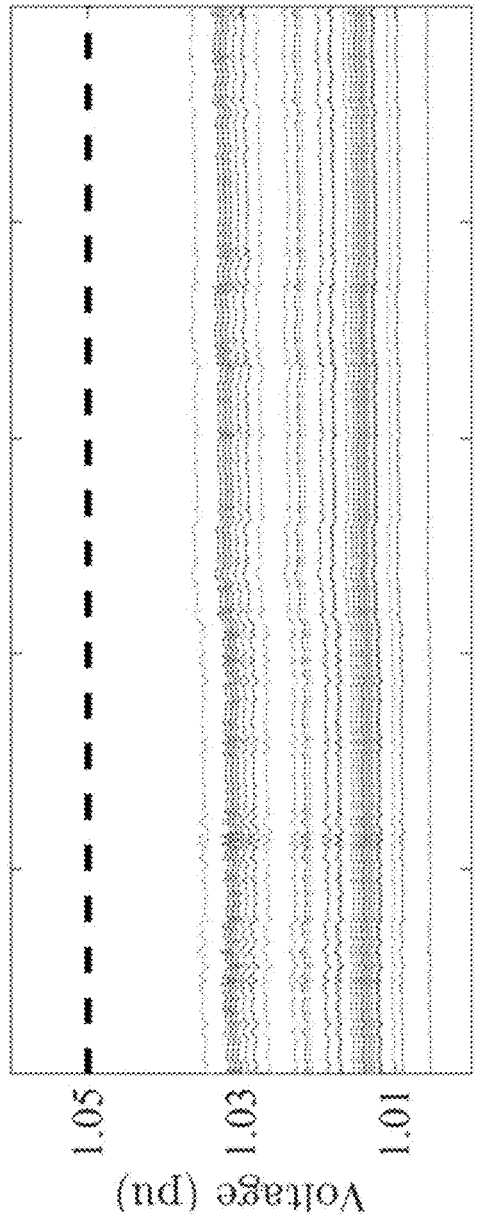

FIGS. 6A and 6B are graphical plots illustrating additional simulation results of network-cognizant droop control, in accordance with one or more aspects of the present disclosure. Specifically, FIG. 6A shows voltage profiles for a five minute period, and FIG. 6B shows Volt/VAR/Watt droop control values. In FIG. 6A, each droop coefficient was made steeper by -0.075. This overly aggressive control behavior results in voltage oscillations violating the upper 1.05 pu bound, as seen in FIG. 6A. This motivates the use of explicitly including a constraint on stability in the optimization problem, rather than designing the control techniques according to heuristics. In addition to the potential of voltage oscillations, control devices whose settings are not updated over time may not be able to cope with the changing power and voltage fluctuations.

Figure 7A:
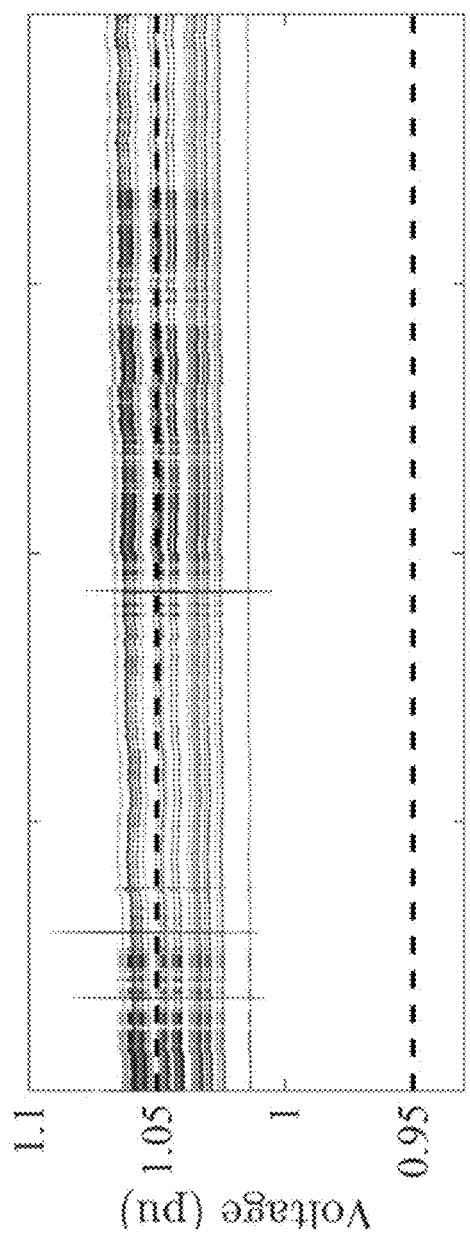
FIGS. 7A and 7B are graphical plots illustrating comparative simulation results of network-cognizant droop control, in accordance with one or more aspects of the present disclosure.
Figure 7B:
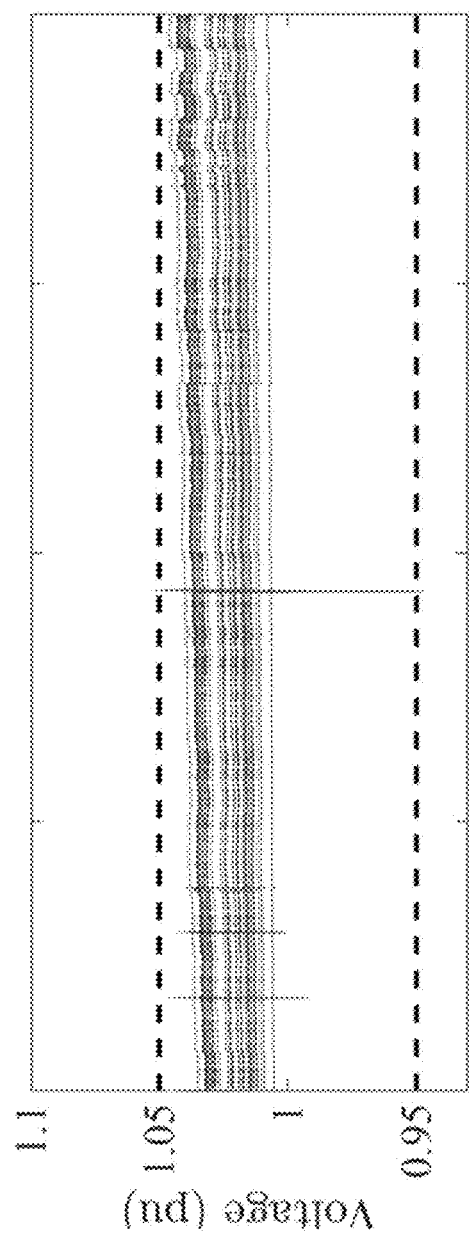

FIGS. 7A and 7B are graphical plots illustrating comparative simulation results of network-cognizant droop control, in accordance with one or more aspects of the present disclosure. Specifically, FIG. 7A illustrates voltages over an hour with the IEEE 1547 Volt/VAR standard guidelines and FIG. 7B illustrates voltages over the hour resulting from the network-cognizant droop control techniques described herein. In comparison with the droop coefficients chosen via the Volt/VAR/Watt optimization problem, using the IEEE standard may result in undesirable voltage behavior, in this case violating the upper 1.05 pu bound.

When planning for DER installation or when operating in a system constrained by communication limitations, there may be situations when the number of inverters participating in voltage support may be restricted. This objective, formulated in (26), was used to optimize droop coefficients for 11:00 AM-11:15 AM. The weighting parameters $\eta_p$ and $\eta_q$ were varied and the resulting coefficients from each of the cases are tabulated in Table I. In the first two columns where $\eta_p=\eta_q=0$, the control matrices are full, and droop control is performed at every inverter. As expected, as the weighting terms increase, locations near the leaves of the feeder are selected as the most optimal for placement of the controllers. In the last column of the table, only one location is chosen to provide Volt/VAR support; however, it is worth noticing that the magnitude of the coefficient in this location is much greater than the individual coefficients when multiple inverters are participating. This is so that the impact of voltage control can still be high without the costly requirement of having multiple controllers.

TABLE I

Resulting droop coefficients when the number of controllers is penalized

| | $\eta_p = \eta_q = 0$ | | $\eta_p = \eta_q = 0.001$ | | $\eta_p = \eta_q = 0.01$ | |
| --- | --- | --- | --- | --- | --- | --- |
| Node | $G_p$ | $G_q$ | $G_p$ | $G_q$ | $G_p$ | $G_q$ |
| 4 | −0.002 | −0.009 | 0 | 0 | 0 | 0 |
| 7 | −0.001 | −0.019 | 0 | 0 | 0 | 0 |
| 9 | −0.003 | −0.037 | −0.001 | 0 | 0 | 0 |
| 10 | −0.005 | −0.055 | −0.003 | −0.002 | 0 | 0 |
| 11 | −0.003 | −0.041 | −0.004 | −0.010 | 0 | 0 |
| 13 | −0.003 | −0.046 | −0.013 | −0.044 | 0 | 0 |
| 16 | −0.004 | −0.057 | −0.005 | −0.024 | 0 | 0 |
| 17 | −0.001 | −0.017 | 0 | 0 | 0 | 0 |
| 20 | −0.002 | −0.027 | −0.001 | 0 | 0 | 0 |
| 22 | −0.004 | −0.041 | −0.005 | −0.025 | 0 | 0 |
| 23 | −0.005 | −0.047 | −0.006 | −0.035 | 0 | 0 |
| 26 | −0.007 | −0.061 | −0.009 | −0.051 | 0 | 0 |
| 28 | −0.011 | −0.075 | −0.014 | −0.073 | −0.002 | 0 |
| 29 | −0.012 | −0.077 | −0.015 | −0.074 | −0.004 | 0 |
| 30 | −0.012 | −0.081 | −0.015 | −0.075 | −0.005 | 0 |
| 31 | −0.012 | −0.083 | −0.015 | −0.077 | −0.006 | 0 |
| 32 | −0.012 | −0.083 | −0.015 | −0.077 | −0.006 | 0 |
| 33 | −0.012 | −0.087 | −0.015 | −0.080 | −0.006 | 0 |
| 34 | −0.016 | −0.095 | −0.020 | −0.102 | −0.020 | 0 |
| 35 | −0.027 | −0.097 | −0.037 | −0.132 | −0.056 | −0.311 |
| 36 | −0.016 | −0.099 | −0.019 | −0.104 | −0.019 | 0 |

In conclusion, the present disclosure details the design of proportional control techniques for use by DERs for voltage regulation purposes, as well as providing the proportional control techniques themselves. The design of the coefficients for use with the disclosed control techniques leverage suitable linear approximation of the AC power-flow equations and are robust to uncertainty in the forecasted non-controllable loads/power injections. Stability of the local control techniques described herein has been analytically established.

The simulation results included herein highlight that the control techniques of the present disclosure exhibit superior performance compared to the standardized Volt/Var method in terms of stability and voltage regulation capabilities. Particularly, if the droop coefficients are not tuned properly or set using rule-of-thumb guidelines, voltage oscillations can occur due to fast timescale fluctuations in load and solar irradiance, or under/over voltage conditions may be encountered.

One or more aspects of the techniques described herein may additionally or alternatively be described by one or more of the following examples:

Example 1

A device comprising: at least one processor configured to: determine, based on (i) a model representing a structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and cause at least one controllable energy resource in the plurality of energy resources to modify an output power of the at least one energy resource based on the respective value of the first droop coefficient and the respective value of the second droop coefficient.

Example 2

The device of example 1, wherein: the indication of predicted uncontrollable power injections comprises an interval prediction of uncontrollable power injections in the power system, and the processor is configured to determine the respective value of the first droop coefficient and the respective value of the second droop coefficient by solving a robust optimization problem.

Example 3

The device of any of examples 1-2, wherein the at least one processor is configured to determine the respective value of the first droop coefficient and the respective value of the second droop coefficient based further on a stability margin parameter that represents a likelihood of maintained stability of the power system when the at least one controllable energy resource modifies the output power based on the respective value of the first droop coefficient and the respective value of the second droop coefficient.

Example 4

The device of any of examples 1-3, wherein receiving the model representing the physical connection structure of the power system comprises receiving coefficients of a linear model of voltage values in the power system as a function of active and reactive power production values and load values in the power system.

Example 5

The device of any of examples 1, 3, or 4, wherein the indication of predicted uncontrollable power injections comprises a point prediction of uncontrollable power injections in the power system.

Example 6

The device of any of examples 1-5, wherein the predicted uncontrollable power injections in the power system comprise predicted uncontrollable power productions and uncontrollable loads.

Example 7

The device of any of examples 1-6, wherein the at least one processor is further configured to: receive the model; and receive the indication of predicted uncontrollable power injections.

Example 8

A system comprising: a power management unit configured to: determine, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and output the respective value of the first droop coefficient and the respective value of the second droop coefficient; and a plurality of controllable energy resources in the plurality of energy resources, wherein each controllable energy resource in the plurality of controllable energy resources is configured to: receive the respective value of the first droop coefficient and the respective value of the second droop coefficient; determine a respective voltage value corresponding to a point at which the controllable energy resource is connected to the power system; determine, based on the respective value of the first droop coefficient, the respective value of the second droop coefficient, and the respective voltage value, a respective value of an active power setpoint and a respective value of a reactive power setpoint; and modify a respective output power of the controllable energy resource based on at least one of the respective value of the active power setpoint or the respective value of the reactive power setpoint.

Example 9

The system of example 8, wherein: the indication of predicted uncontrollable power injections comprises an interval prediction of uncontrollable power injections in the power system, and the power management unit is configured to determine the respective value of the first droop coefficient and the respective value of the second droop coefficient by solving a robust optimization problem.

Example 10

The system of any of examples 8-9, wherein the power management unit is configured to determine the respective value of the first droop coefficient and the value of the respective second droop coefficient based further on a stability margin parameter that represents a likelihood of maintained stability of the power system when the plurality of controllable energy resources each modifies the output power based on the respective value of the first droop coefficient and the respective value of the second droop coefficient.

Example 11

The system of any of examples 8-10, wherein the power management unit is configured to receive the model representing the physical connection structure of the power system by receiving coefficients of a linear model of voltage values in the power system as a function of active and reactive power production values and load values in the power system.

Example 12

The system of any of examples 8, 10, or 11, wherein the indication of predicted uncontrollable power injections comprises a point prediction of uncontrollable power injections in the power system.

Example 13

The system of any of examples 8-12, wherein the predicted uncontrollable power injections in the power system comprise predicted uncontrollable power productions and uncontrollable loads.

Example 14

The system of any of examples 8-13, wherein at least one controllable energy resource in the plurality of controllable energy resources is configured to determine the respective value of the active power setpoint and the respective value of the reactive power setpoint by: determining a respective candidate value of the active power setpoint and a respective candidate value of the reactive power setpoint; and projecting the respective candidate value of the active power setpoint and the respective candidate value of the reactive power setpoint onto a respective set of feasible power setpoints for the at least one controllable energy resource.

Example 15

The system of any of examples 8-14, wherein at least one controllable energy resource in the plurality of controllable energy resources is configured to determine the respective value of the active power setpoint and the respective value of the reactive power setpoint based further on at least one respective objective representing a desired limitation on the respective output power of the controllable energy resource.

Example 16

The system of example 15, wherein the at least one respective objective represents a desired limitation on real power production, a desired limitation on reactive power production, or a desired limitation on both real and reactive power production.

Example 17

The system of any of examples 8-16, wherein: the power management unit is configured to iteratively determine the respective value of the first droop coefficient and the respective value of the second droop coefficient at a first frequency; and each controllable energy resource in the plurality of controllable energy resources is configured to determine the respective value of the active power setpoint and the respective value of the reactive power setpoint at a second frequency that is higher than the first frequency.

Example 18

The system of any of examples 8-17, wherein the power management unit is further configured to: receive the model; and receive the indication of predicted uncontrollable power injections in the power system.

Example 19

A method comprising: determining, by a power management unit comprising at least one processor, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and causing, by the power management unit, at least one controllable energy resource in the plurality of energy resources to modify an output power of the at least one energy resource based on the respective value of the first droop coefficient and the respective value of the second droop coefficient.

Example 20

The method of example 18, wherein: the indication of predicted uncontrollable power injections comprises an interval prediction of uncontrollable power injections in the power system, and determining the respective value of the first droop coefficient and the respective value of the second droop coefficient comprises solving a robust optimization problem.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure.

What is claimed is:

1. A device comprising:
   at least one processor configured to:
      determine, based on (i) a model representing a structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and
      cause at least one controllable energy resource in the plurality of energy resources to modify an output power of the at least one energy resource based on the respective value of the first droop coefficient and the respective value of the second droop coefficient, wherein:
         the indication of predicted uncontrollable power injections comprises an interval prediction of uncontrollable power injections in the power system, and
         the processor is configured to determine the respective value of the first droop coefficient and the respective value of the second droop coefficient by solving a robust optimization problem.

2. The device of claim 1, wherein the at least one processor is configured to determine the respective value of the first droop coefficient and the respective value of the second droop coefficient based further on a stability margin parameter that represents a likelihood of maintained stability of the power system when the at least one controllable energy resource modifies the output power based on the respective value of the first droop coefficient and the respective value of the second droop coefficient.

3. The device of claim 1, wherein receiving the model representing the physical connection structure of the power system comprises receiving coefficients of a linear model of voltage values in the power system as a function of active and reactive power production values and load values in the power system.

4. The device of claim 1, wherein the indication of predicted uncontrollable power injections comprises a point prediction of uncontrollable power injections in the power system.

5. The device of claim 1, wherein the predicted uncontrollable power injections in the power system comprise predicted uncontrollable power productions and uncontrollable loads.

6. The device of claim 1, wherein the at least one processor is further configured to:
   receive the model; and
   receive the indication of predicted uncontrollable power injections.

7. A system comprising:
   a power management unit configured to:
      determine, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and
      output the respective value of the first droop coefficient and the respective value of the second droop coefficient; and
   a plurality of controllable energy resources in the plurality of energy resources, wherein each controllable energy resource in the plurality of controllable energy resources is configured to:
      receive the respective value of the first droop coefficient and the respective value of the second droop coefficient;
      determine a respective voltage value corresponding to a point at which the controllable energy resource is connected to the power system;
      determine, based on the respective value of the first droop coefficient, the respective value of the second droop coefficient, and the respective voltage value, a respective value of an active power setpoint and a respective value of a reactive power setpoint; and
      modify a respective output power of the controllable energy resource based on at least one of the respective value of the active power setpoint or the respective value of the reactive power setpoint.

8. The system of claim 7, wherein:
   the indication of predicted uncontrollable power injections comprises an interval prediction of uncontrollable power injections in the power system, and
   the power management unit is configured to determine the respective value of the first droop coefficient and the respective value of the second droop coefficient by solving a robust optimization problem.

9. The system of claim 7, wherein the power management unit is configured to determine the respective value of the first droop coefficient and the value of the respective second droop coefficient based further on a stability margin parameter that represents a likelihood of maintained stability of the power system when the plurality of controllable energy resources each modifies the output power based on the respective value of the first droop coefficient and the respective value of the second droop coefficient.

10. The system of claim 7, wherein the power management unit is configured to receive the model representing the physical connection structure of the power system by receiving coefficients of a linear model of voltage values in the power system as a function of active and reactive power production values and load values in the power system.

11. The system of claim 7, wherein the indication of predicted uncontrollable power injections comprises a point prediction of uncontrollable power injections in the power system.

12. The system of claim 7, wherein the predicted uncontrollable power injections in the power system comprise predicted uncontrollable power productions and uncontrollable loads.

13. The system of claim 7, wherein at least one controllable energy resource in the plurality of controllable energy resources is configured to determine the respective value of the active power setpoint and the respective value of the reactive power setpoint by:
   determining a respective candidate value of the active power setpoint and a respective candidate value of the reactive power setpoint; and
   projecting the respective candidate value of the active power setpoint and the respective candidate value of the reactive power setpoint onto a respective set of feasible power setpoints for the at least one controllable energy resource.

14. The system of claim 7, wherein at least one controllable energy resource in the plurality of controllable energy resources is configured to determine the respective value of the active power setpoint and the respective value of the reactive power setpoint based further on at least one respective objective representing a desired limitation on the respective output power of the controllable energy resource.

15. The system of claim 14, wherein the at least one respective objective represents a desired limitation on real power production, a desired limitation on reactive power production, or a desired limitation on both real and reactive power production.

16. The system of claim 7, wherein:
   the power management unit is configured to iteratively determine the respective value of the first droop coefficient and the respective value of the second droop coefficient at a first frequency; and
   each controllable energy resource in the plurality of controllable energy resources is configured to determine the respective value of the active power setpoint and the respective value of the reactive power setpoint at a second frequency that is higher than the first frequency.

17. The system of claim 7, wherein the power management unit is further configured to:
   receive the model; and
   receive the indication of predicted uncontrollable power injections in the power system.

18. A method comprising:
   determining, by a power management unit comprising at least one processor, based on (i) a model representing a physical connection structure of a power system that includes a plurality of energy resources and (ii) an indication of predicted uncontrollable power injections in the power system, for each controllable energy resource in the plurality of energy resources, a respective value of a first droop coefficient and a respective value of a second droop coefficient; and
   causing, by the power management unit, at least one controllable energy resource in the plurality of energy resources to modify an output power of the at least one energy resource based on the respective value of the first droop coefficient and the respective value of the second droop coefficient, wherein:
   the indication of predicted uncontrollable power injections comprises an interval prediction of uncontrollable power injections in the power system, and
   the processor is configured to determine the respective value of the first droop coefficient and the respective value of the second droop coefficient by solving a robust optimization problem.

* * * * *